UNITED STATES PATENT OFFICE.

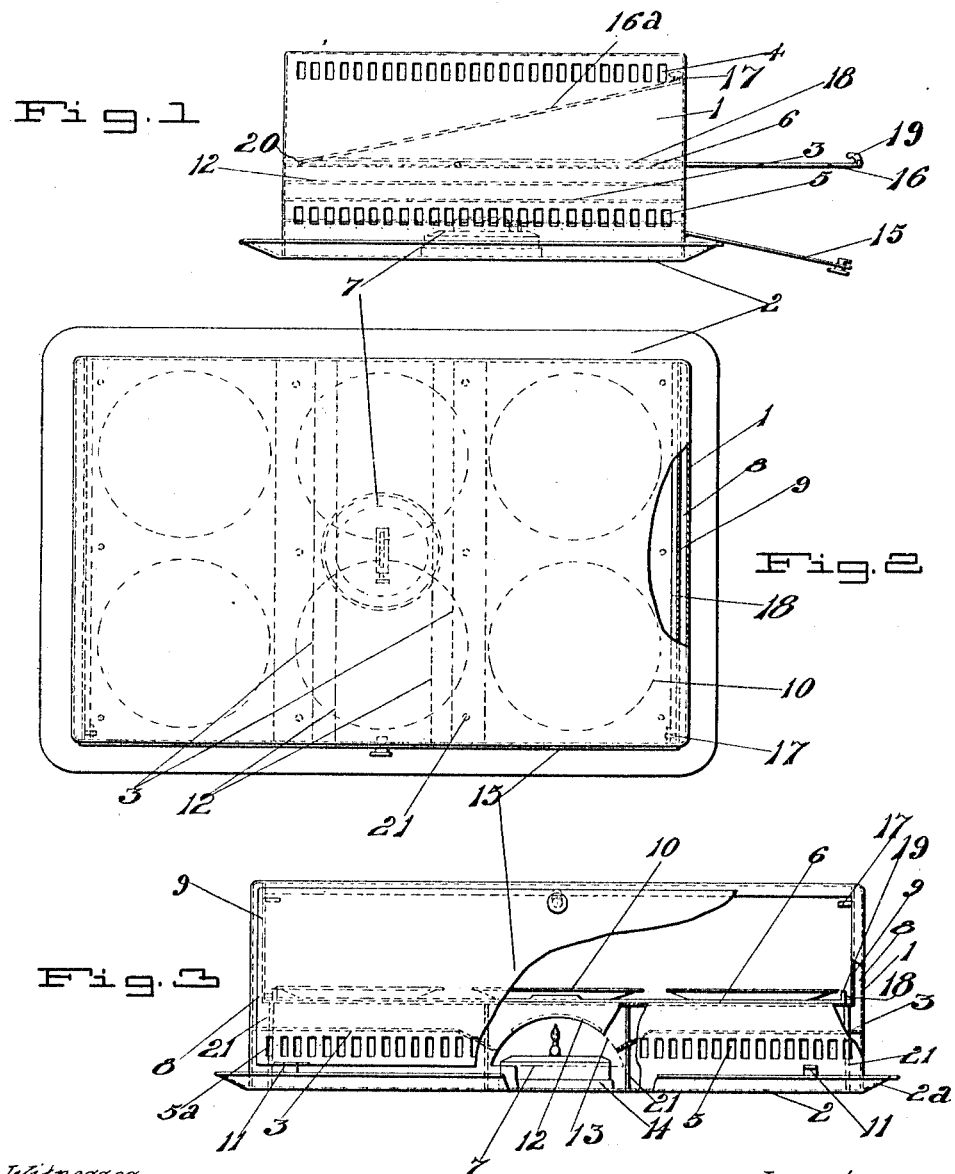

JOHN JONES, OF PORTLAND, OREGON.

TRAY.

1,107,799.   Specification of Letters Patent.   Patented Aug. 18, 1914.

Application filed December 4, 1913. Serial No. 804,626.

*To all whom it may concern:*

Be it known that I, JOHN JONES, a citizen of the United States, residing at Portland, in the county of Multnomah and State of Oregon, have invented certain new and useful Improvements in Trays, of which the following is a specification.

This invention pertains to trays, and it has for its object to provide a tray adapted for use in carrying food a considerable distance; and a further object is to provide a heating compartment with means for supplying heat, so that the food may be kept at a warm temperature, while being conveyed from the place of its preparation. These and other objects are accomplished by means of the structure illustrated in the accompanying drawing, in which—

Figure 1 is an end elevation of the tray showing the door open and the movable floor partially withdrawn. Fig. 2 is a plan view of the tray, partly in section. Fig. 3 is a front side elevation, with a portion of the side member broken away to show the interior.

Describing the drawing in detail, 1 designates the body of the tray which is made of light sheet metal, preferably of aluminum, having a closed rectangular form open at the front side.

2 represents the base or bottom portion of the tray upon which the body 1 rises. Extending from the base is an upwardly inclined rim 2ª which forms a hand hold for use in carrying the tray. This rim is extended from each of the four sides. Upon the base 2 a plurality of risers 21 are placed which form a support for the fixed floor 6. Lengthwise in the median portion between risers 21 is formed a heating compartment having open ends and in the center of the floor thereof is formed a seat 14 to receive a heater, such as the lamp 7.

From each side of the heating chamber a partition 3 extends to the corresponding end of the body 1, thus forming a second floor in each end portion a short distance below the fixed floor 6. This floor 6 terminates a short distance within the end walls. From each end of floor 6 an inner wall 9 rises, thus leaving a space 8 reaching the top of the main body, each communicating with the corresponding passage or duct leading from the heating compartment. Above the lamp is placed a deflector 12 which prevents articles directly above this point in the food compartment from becoming too warm, and it serves to direct the currents of heated air which enters at the open ends, into the spaces 13, between the floors 3 and 6. To the front side of the base 2 are fixed hinges 11 to which is hinged the front door 15 which is adapted to securely close the open front side.

In the bottom portion of the door and of the side walls are a plurality of openings 5 to admit air to the lamp and along the upper portion of each end is a series of similar openings 4 communicating with the spaces 8 and enabling a draft to be produced to carry the heated air to the limit of each end. Along the interior of each side wall above the floor 6 is fixed a strip 18 beneath which are engaged the laterally projecting lugs 20 from the movable floor 16 which rests upon the main floor 6. This sliding floor may be withdrawn to any extent desired, to place the plates 10 thereon, where they are easily accessible; and the lugs 20 being at the rear edge of the floor, at the same time support it when withdrawn to the front, and also permit it to be raised as indicated at 16ª, for cleaning or for other purposes where the floor may be anchored by means of the hooks 19, upon the lugs 17.

By means of the structure above described a tray is formed which is neat in appearance and which is easily manipulated in use. It moreover can be readily heated and food carried therein may be kept in condition for serving for an indefinite period.

Having thus described my invention what I claim, is—

1. A waiter's tray comprising a base, having a rim which is shaped to form a hand hold, a body portion open at its front side rising from a point within said rim, a horizontal floor slidably secured at an intermediate point in the body portion, means for securing said floor in varying positions, a door for closing said open side, and a heating chamber formed at an intermediate point in said body portion.

2. In combination, a waiter's tray comprising a base, having a rim which is shaped to form a hand hold, a body portion open at one side, rising therefrom, a heating chamber having open ends formed centrally across the body portion, a horizontal floor slidably secured at an intermediate point in said body above the heating chamber, means limiting the forward movement thereof, a door for closing said open side, a seat formed centrally in the floor of the heating compartment, and means for distributing the heated air rising in said compartment.

3. In combination a waiter's tray comprising a base, having a rim which is shaped to form a hand hold, a plurality of risers secured upon said base within the rim thereof, a body portion containing compartments formed upon said risers, a heating chamber formed centrally across the body portion, a horizontal floor slidably secured at an intermediate point above the heating chamber, and means for distributing the heated air rising therein.

4. A waiter's tray comprising a base, having a rim which is shaped to form a hand hold, a body portion having a fixed horizontal floor, supported thereon, the end walls of the body portion and the fixed floor forming an air space, and a heating chamber beneath said floor communicating with said air space.

In testimony whereof I affix my signature in presence of two witnesses.

JOHN JONES.

Witnesses:
E. EARL FEIKE,
HELEN K. NICHOLS.

Copies of this patent may be obtained for five cents each, by addressing the "Commissioner of Patents, Washington, D. C."